(12) United States Patent
Takakura

(10) Patent No.: US 7,270,310 B2
(45) Date of Patent: Sep. 18, 2007

(54) ELECTROMAGNETIC VALVE AND VAPOR FUEL TREATING SYSTEM APPLYING THE SAME

(75) Inventor: Shinsuke Takakura, Kariya (JP)

(73) Assignee: DENSO Corporation (JP)

( * ) Notice: Subject to any disclaimer, the term of this patent is extended or adjusted under 35 U.S.C. 154(b) by 76 days.

(21) Appl. No.: 11/092,811

(22) Filed: Mar. 30, 2005

(65) Prior Publication Data

US 2005/0217734 A1 Oct. 6, 2005

(30) Foreign Application Priority Data

Mar. 31, 2004 (JP) ............... 2004-103406

(51) Int. Cl.
*F16K 31/12* (2006.01)
(52) U.S. Cl. .................................. 251/30.04
(58) Field of Classification Search ............ 251/30.03, 251/30.04, 30.05, 122; 137/137, 630, 519; 123/519
See application file for complete search history.

(56) References Cited

U.S. PATENT DOCUMENTS

| | | | | |
|---|---|---|---|---|
| 3,424,426 A | * | 1/1969 | Neff | 251/30.03 |
| 3,447,773 A | * | 6/1969 | Huber | 251/30.03 |
| 3,655,163 A | * | 4/1972 | Rattan et al. | 251/45 |
| 5,048,790 A | * | 9/1991 | Wells | 251/30.04 |
| 5,370,354 A | * | 12/1994 | Kunz | 251/30.02 |
| 6,435,210 B1 | * | 8/2002 | Obersteiner et al. | 137/599.18 |
| 6,526,951 B2 | * | 3/2003 | Ishigaki et al. | 123/519 |
| 2001/0017160 A1 | | 8/2001 | Ishigaki et al. | |
| 2003/0132409 A1 | * | 7/2003 | Birkelund | 251/30.04 |

FOREIGN PATENT DOCUMENTS

| | | |
|---|---|---|
| JP | A-H11-344145 | 12/1999 |
| JP | A-2001-241563 | 9/2001 |

\* cited by examiner

*Primary Examiner*—Eric Keasel
*Assistant Examiner*—Cloud Lee
(74) *Attorney, Agent, or Firm*—Nixon & Vanderhye PC

(57) ABSTRACT

A first connecting pipe of an electromagnetic valve connects with the fuel tank, and a second connecting pipe connects with a canister. A spring urges a moving core and a first valve body in a closing direction of a electromagnetic valve. A shaft of the first valve body includes a fluid-amount controlling portion on the top. The fluid-amount controlling portion is inserted to the communicating passage while a contact member of bellows seats on a convex of a rubber member, and is tapered in an inserted direction. When a coil is energized, the first valve body is lifted in the direction in which the fluid-amount controlling portion retracts from the communicating passage.

7 Claims, 8 Drawing Sheets

US 7,270,310 B2

ELECTROMAGNETIC VALVE AND VAPOR FUEL TREATING SYSTEM APPLYING THE SAME

CROSS-REFERENCE TO RELATED APPLICATION

This application is based on Japanese Patent Application No. 2004-103406 filed on Mar. 31, 2004, disclosure of which is incorporated herein by reference.

FIELD OF THE INVENTION

The present invention relates to an electromagnetic valve having two valve bodies being movable dependently, and a vapor fuel treating system applying the electromagnetic valve.

BACKGROUND OF THE INVENTION

An electromagnetic valve disclosed in JP-11-344145A and JP-2001-241563A has two valve bodies each of which operates in series at the valve opening timing to prevent a rapid increase of an opening area through which a fluid flows. As shown in FIG. 12A, when a coil is energized, a first valve body 400 is lifted from a second valve body 410, so that a fluid flows to a fluid passage 420 through a communicating passage 412 formed inside the second valve body 410. Then the second valve body 410 is lifted from a valve seat 422 formed at an opening side of the fluid passage 420 in response to a decrease of a pressure difference between an upstream side and a downstream side of the second valve body 410, and thereby the fluid amount increases due to the increase of the opening area. FIG. 12B discloses how the opening area changes before the second valve body 410 is lifted from the valve seat 422.

However, when the first valve body 400 is lifted from the second valve body 410 and the fluid flows to the fluid passage 420 through the communicating passage 412, pressure-reflected waves arise to the downstream of the fluid passage 420 due to the volume change of the passage. Therefore, as shown in FIG. 13 (pressure of zero indicates atmospheric pressure in FIG. 13), the pressure is apt to change. For example, if the pressure of the fluid passage 420 changes sharply, the second valve body 410 tends to be lifted from the valve seat 422 in the timing other than the suitable timing. Then, the lift timing of the second valve body 410 fluctuates due to the pressure fluctuation. In the electro magnetic valve disclosed in JP-11-344145A and JP-2001-241563A, the lift timing of the second valve body tends to fluctuate because the opening area varies similarly to a change as illustrated in FIG. 12B before the second valve body is lifted.

In the JP-11-344145A, a part of a main valve corresponding to the second valve body as disclosed above protrudes toward the passage side. Therefore, the sharp increase of the fluid amount due to the sharp increase of the opening area can be prevented when the main valve is lifted, so that the pressure change can be prevented. However the fluid flowing into the downstream through the pilot passage formed inside the main valve causes a pressure change to the downstream of the fluid passage when the pilot valve corresponding to the first valve body is lifted. As a result, the lift timing of the main valve tends to fluctuate.

SUMMARY OF THE INVENTION

The present invention is made in view of the above matters, and it is an object of the present invention to suppress the fluctuation of the lift timing of the second valve body provided in the electromagnetic valve.

According to the first aspect of the present invention, even if a first valve body is lifted from the first valve seat while a second valve body seats on the second valve seat, a fluid-amount controlling portion formed on the first valve body is in the communicating passage. Thus, the opening area that a fluid flows from the space between the first valve body and the second valve body to the second fluid passage through the communicating passage becomes smaller than the passage area of the communicating passage, so that the increase of the opening area is restrained, and consequently the fluid amount flowing from the communicating passage is restrained. Therefore, the pressure change arising in fluid passage decreases, so that the fluctuation of the timing when the second valve body is lifted from the second valve seat is prevented.

According to the second aspect of the present invention, in a vapor fuel treating system, the electromagnetic valve described above is located between a fuel tank and a canister, so that the lift timing fluctuation of the second valve body is prevented. Therefore, the pressure in the fuel tank decreases to an air pressure within a predetermined time, so that a vapor fuel emission from the fuel tank and the canister to the air is prevented.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 4A shows the status in which a shaft begins to lift when a coil is energized, FIG. 4B shows the status in which a shaft is lifted moreover, FIG. 4C shows the status in which a pressure receiving member begins to lift;

DETAILED DESCRIPTION OF PREFERRED EMBODIMENTS

Embodiments of the present invention will be described hereinafter with reference to the drawings.

Figure 2:
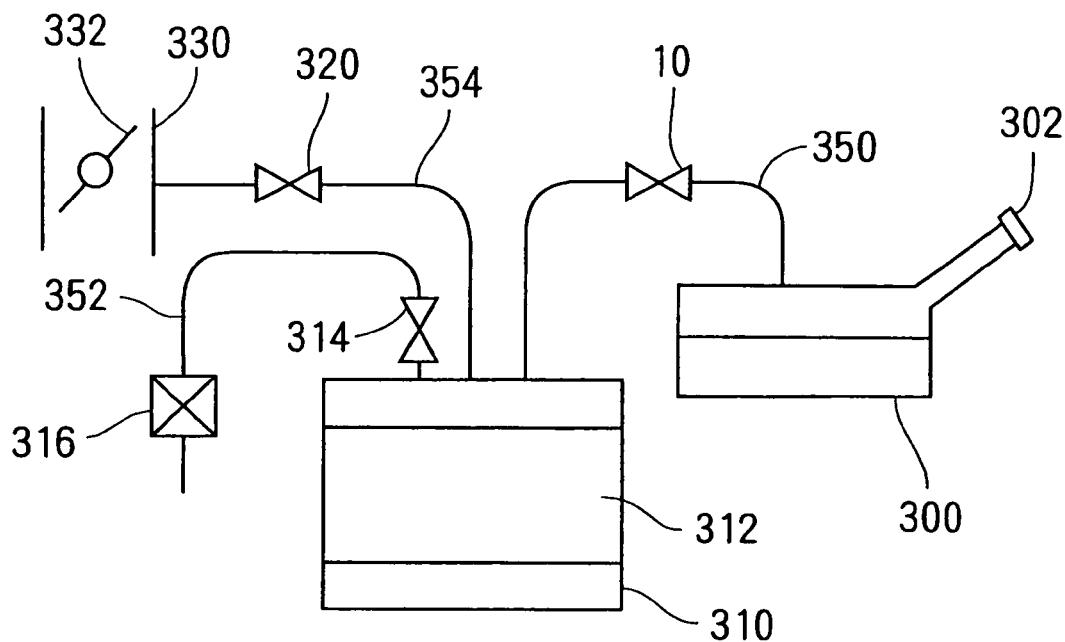
FIG. 2 is a scheme view showing a fuel tank sealing system including the electromagnetic valve.

FIG. 2 shows a fuel tank sealing system including an electromagnetic valve 10. The fuel tank sealing system is a sort of a vapor fuel treating system and is applied to a hybrid car selecting either an electrical motor or an internal combustion according to driving status.

A fuel tank 300 is communicated with a canister 310 through a pipe 350. The electromagnetic valve 10 is formed inside the pipe 350. The canister 310 includes an absorbent 312 to absorb a vapor fuel. When an electromagnetic valve 314 is opened, the canister 310 is exposed to the atmosphere through a pipe 352. A filter 316 is provided at an atmosphere opening side of the electromagnetic valve 314. The Canister 310 is communicated with an intake air passage 330 through a pipe 354. When a vapor fuel absorbed in the canister 310 is discharged due to a vacuum arising downstream of a throttle valve 332, a purge valve 320 provided at the pipe 354 and the electromagnetic valve 314 are opened.

The fuel tank sealing system cannot discharge a vapor fuel absorbed in the canister 310 to the intake air passage 330 when the hybrid car is driven by an electric motor because the vacuum does not arise. Thus, the fuel tank 300 is sealed by closing the electromagnetic valve 10 disposed between the fuel tank 300 and canister 310, so that an overflow due to absorbing excessively a vapor fuel by absorbent 312 is prevented.

Also in the fuel sealing tank system, when a driver works a lever of a filler opening (not shown) to refuel into the fuel tank 300, an opening signal is inputted into an engine ECU (Electric Control Unit: not shown), so that the engine ECU makes the electromagnetic valve 10 open. Accordingly the fuel tank 300 communicates with canister 310 through the pipe 350, and the pressure of fuel tank 300 decreases to an atmosphere, so that the vapor fuel is not discharged from the fuel tank 300 to the air through the filler opening even if a cap of the filler opening is opened.

A structure of the electromagnetic valve 10 will be explained.

Figure 1:
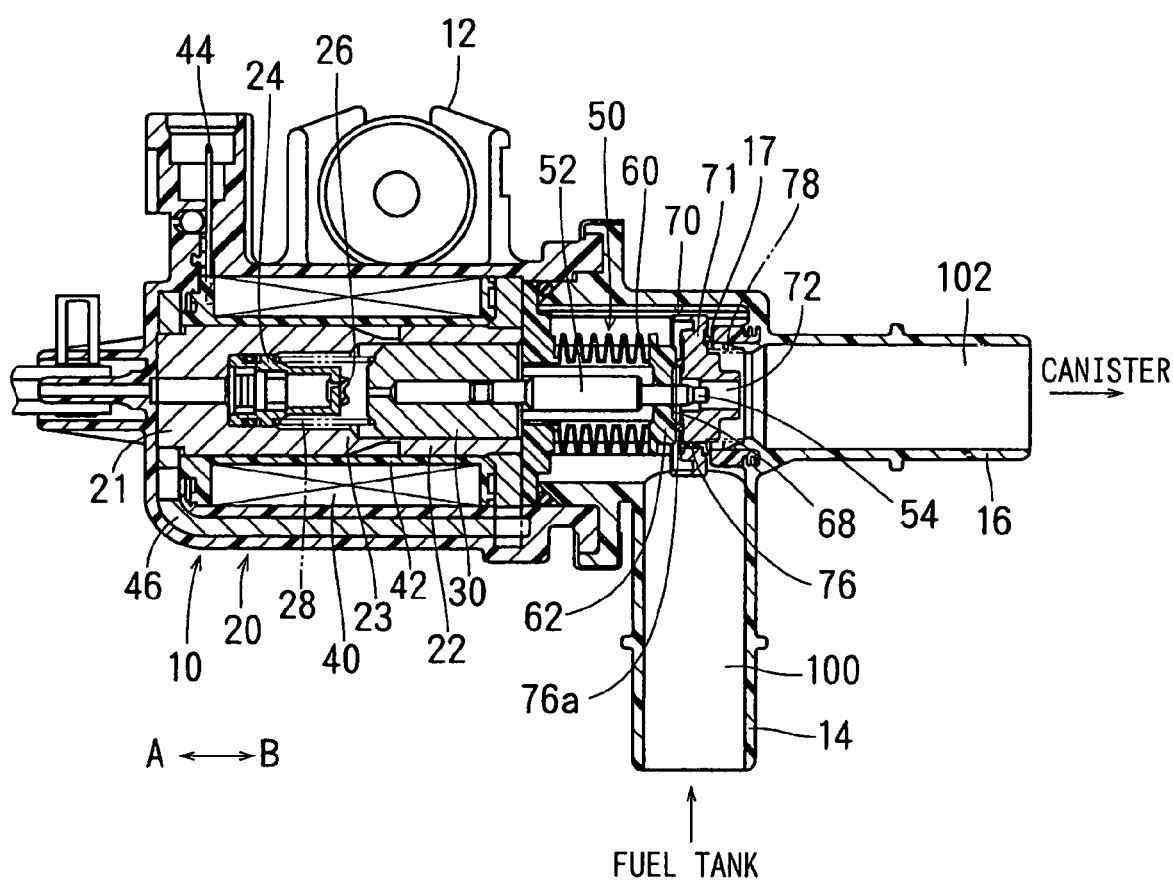
FIG. 1 is a cross-section view showing an electromagnetic valve according to an embodiment of the present invention.

As shown in FIG. 1, the electromagnetic valve 10 is attached to an engine room by a stay 12. A first connecting pipe 14 connects with the fuel tank 300, and a second connecting pipe 16 connects with the canister 310. When the electromagnetic valve 10 opens, a first passage 100 formed in the first connecting pipe 14 communicates with a second connecting passage 102 formed into the second connecting pipe 16. The second connecting pipe 16 forms a second valve seat 17 on opening surface of the other side of the canister 310.

An electromagnetic driving portion 20 includes a stator core 21, a spring 28, a moving core 30, and a coil 40. The stator core 21 includes a holding portion 22 which reciprocatably holds the moving core 30, and an attraction portion 23 arising an attraction force between the moving core 30. The stator core 21 includes a thin-walled portion between the holding portion 22 and the attraction portion 23 to prevent a magnetic short. The stator core 21 includes an engaging member 24, in which the stopper 26 made of rubber is located.

One side of the spring 28 is engaged to the engaging member 24 and the other side to the moving core 30. The spring 28 urges the moving core 30 and the first valve body 50 in a closing direction of the electromagnetic valve 10. The urging force of the spring 28 is set in such a manner that a first valve body 50 does not lift even if a pressure of the fuel tank 300 becomes a vacuum.

The coil 40 wounded around the bobbin 42 covers the periphery of the stator core 21. A terminal 44 is electrically connected with the coil 40 and supplies a driving current. The yoke 46 magnetically connects the holding portion 22 with the attraction portion 23 through the periphery of the coil 40.

Figure 3:
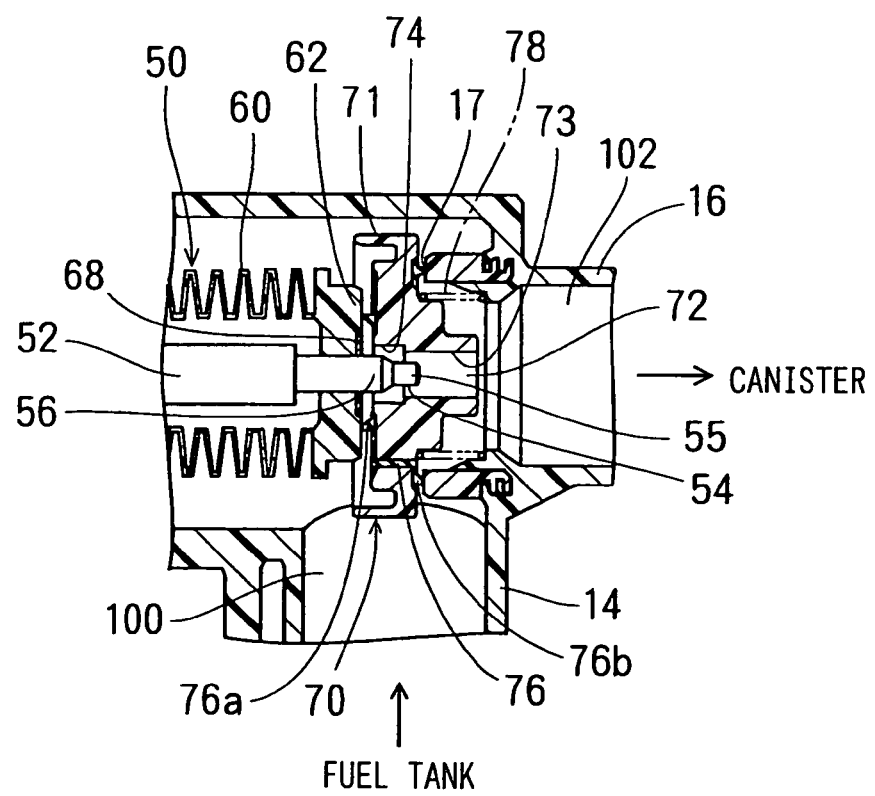
FIG. 3 is a magnified cross-section view showing the first valve body and the second valve body.

A first valve body 50 includes a shaft 52 and a bellows 60. As shown in FIG. 3, a washer 68 connects the shaft 52 with the bellows 60. The shaft 52 includes a fluid-amount controlling portion 54 on top of a pressure receiving member 71. The fluid-amount controlling portion 54 is inserted to the communicating passage 72 while a contact member 62 of the bellows 60 seats on a convex 76a of a rubber member 76. The fluid-amount controlling portion 54 tapers in a inserting direction and comprises a small-diameter portion 55 and a large-diameter portion 56.

A second valve body 70 includes the pressure receiving member 71 and the rubber member 76, and is located on the opposite side of the moving core 30 regarding to the first valve body 50. The pressure receiving member 71 includes the communicating passage 72 penetrating the center of the electromagnetic valve 10. The communicating passage 72 tapers in an inserting direction of the fluid-amount controlling portion 54, and includes a small-diameter portion 73 and a large-diameter portion 74. The rubber member 76 includes the convex 76a protruding toward the first valve body 50 and a convex 76b protruding toward the second valve seat 17. The convex 76a and the convex 76b are annular.

The first valve body 50 is urged by the spring 28 toward the pressure receiving member 71, so that a contact member 62 of the bellows 60 can be seated to the convex 76a. When the contact member 62 is seated to the convex 76a, the communicating passage 72 is closed. A spring 78 urges the pressure receiving member 71 toward the first valve body 50.

An operation of the electromagnetic valve 10 will be explained.

(1) Deenergization of the Coil 40

The first valve body 50 is urged by the spring 28 in a direction illustrated by an arrow B in FIG. 1. As shown in FIG. 3A, when the coil 40 is not energized, the contact member 62 seats on the convex 76a, and the convex 76b seats on the second valve seat 17, so that the communicating passage 72 is closed and communication between the first passage 100 and the second passage 102 is shut.

(2) Energization of the Coil 40

In the fuel tank sealing system, especially, when the fuel tank 300 is refueled, the electromagnetic valve 10 is energized.

Figure 4A:
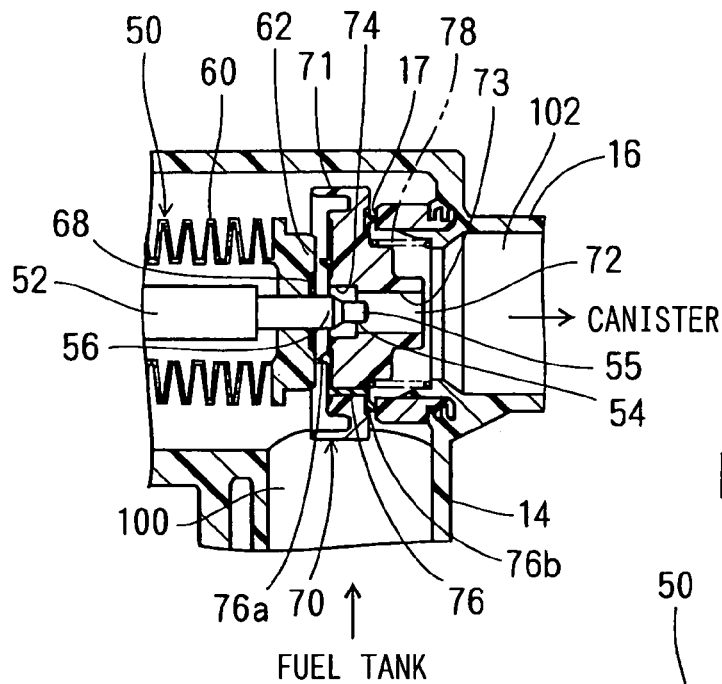
FIGS. 4A to 4C are illustrations showing a connecting process between a fuel tank and a canister.

When the coil 40 is energized, the moving core 30 is attracted to the attraction portion 23 of the stator core 21, so that, as shown in FIG. 4A, the moving core 30 and the first valve body 50 move in a direction illustrated by the arrow A in FIG. 1, and the contact member 62 is lifted from the convex 76a. Then, a fuel in the fuel tank 300 flows from the first passage 100 to the second passage 102 through the communicating passage 72 and the opening formed between the shaft 52 and the pressure receiving member 71. When the first valve body 50 begins to be lifted as shown in FIG. 4A, the opening area of the fluid passage, in which a vapor fuel flows from the first passage 100 to the second passage 102 through the communicating passage 72, is defined by the small-diameter portion 55 and small-diameter portion 73.

Figure 4B:
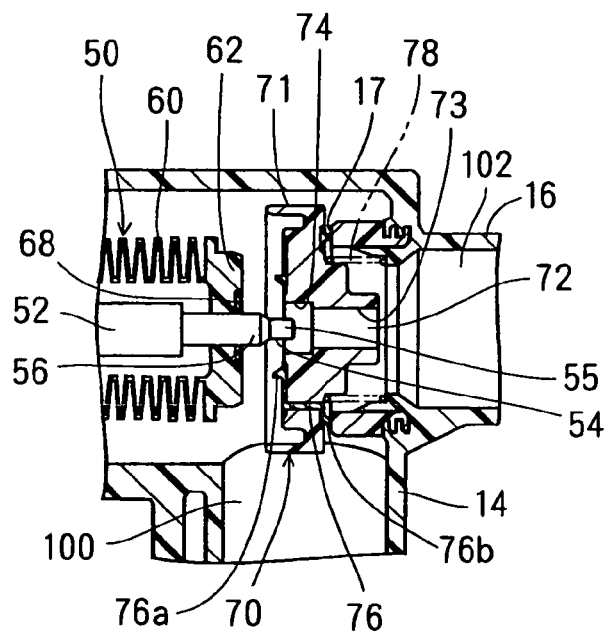

When the first valve body 50 is lifted in the direction illustrated by the arrow A in FIG. 1 and the moving core 30 is engaged with a stopper 26, the small-diameter portion 55 retracts from the small-diameter portion 73 and then moves to the large-diameter portion 74 as shown in FIG. 4B. In present embodiment, even if the first valve body 50 is lifted to the utmost, the fluid-amount controlling portion 54 is in the communicating passage 72. In consequence, the opening area of the fluid passage, in which the vapor fuel flows from the first passage 100 to the second passage 102 through the communicating passage 72, is defined by the large-diameter portion 56 and the large-diameter portion 74. As a result, the opening area shown in FIG. 4B is larger than that shown in FIG. 4A.

Figure 4C:
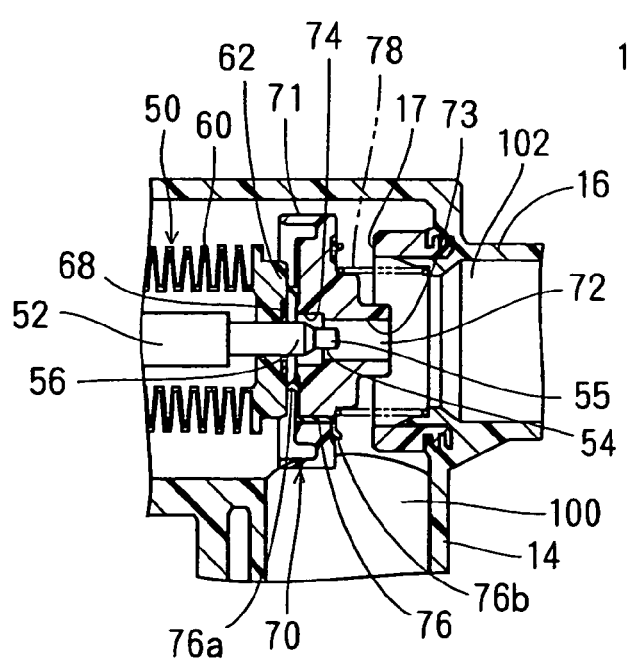

Then, when the vapor fuel flows from the first passage 100 to the second passage 102 through the communicating passage 72, a pressure difference between the first passage 100 and the second passage 102, that is to say, a pressure difference between the fuel tank 300 and the canister 310 decreases, so that the attraction force of the second valve body 70 toward the second valve seat 17 decreases. Consequently, the second valve body 70 is lifted from the second valve seat 17 by the urging force of the spring 78 and is lifted toward the first valve body 50. Then the contact member 62 contacts with the convex 76a as shown in FIG. 4C. The vapor fuel directly flows from the first passage 100 to the second passage 102 detouring the communicating passage 72.

Figure 5A:
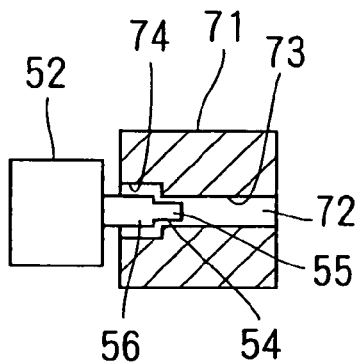
FIGS. 5A and 5B are illustrations showing a lifting status of the shaft.
Figure 5B:
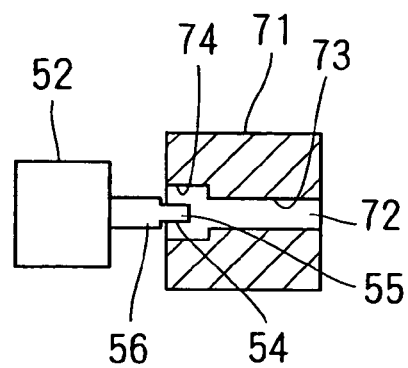
Figure 5C:
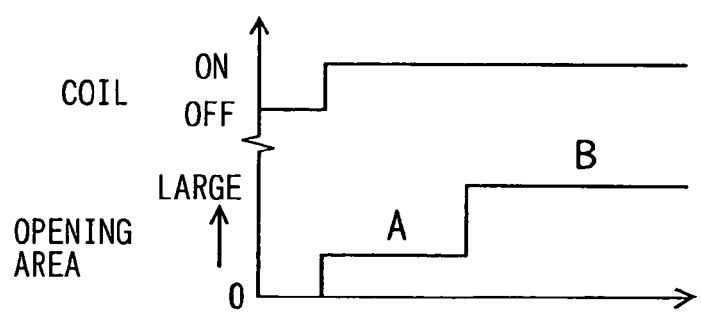
FIG. 5C is a characteristic graph showing a change of the opening area after a coil is energized.
Figure 6:
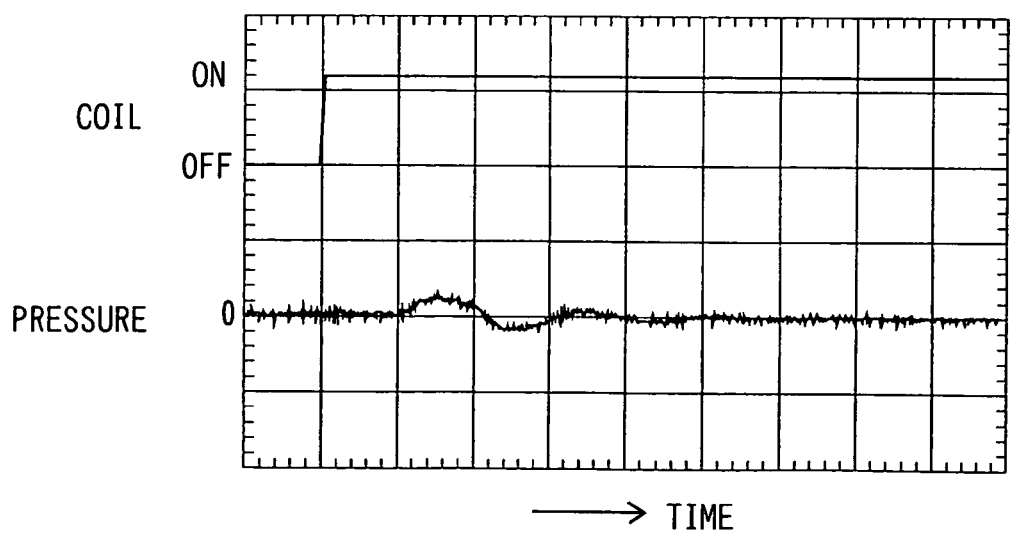
FIG. 6 is a characteristic graph showing a pressure change of the canister after the coil is energized.

According to the present embodiment, after the coil is energized, the shaft 52 is lifted as shown FIGS. 5A and 5B, so that the opening area formed between the fluid-amount controlling portion 54 and the communicating passage 72 increases while the convex 76a seats on the second valve seat 17. That is to say, as shown in FIG. 5C, the first valve body 50 begins to lift from the convex 76a in step A, the increase of the opening area is suppressed, and in the next step B the opening area increases. In consequence, while the second valve body 70 seats on the second valve seat 17, a sharp increase of the vapor fuel amount flowing from the first passage 100 to the second passage 102 through the communicating passage 72 is prevented, so that the pressure change, which generated in the second passage 102 by the pressure wave reflected toward the electromagnetic valve 10 from canister 310, decreases as shown in FIG. 6. Therefore, the fluctuation of the lift timing of the second valve body 70 is suppressed, so that the second valve body 70 can be lifted from the second valve seat 17 in the suitable timing.

(First Modification)

Figure 7A:
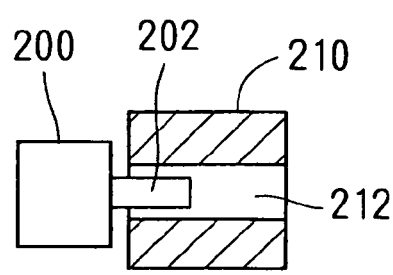
FIGS. 7A and 7B are illustrations showing the lifting status of the shaft according to a first modification.
Figure 7B:
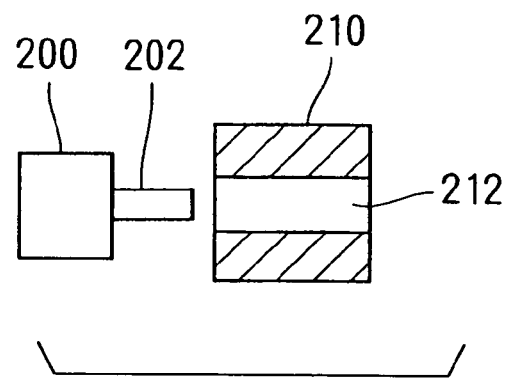

A first modification is shown in FIG. 7. The structures other than the shaft 200 and the pressure receiving member 210 are substantially the same as the present embodiment shown in FIG. 1.

Figure 7C:
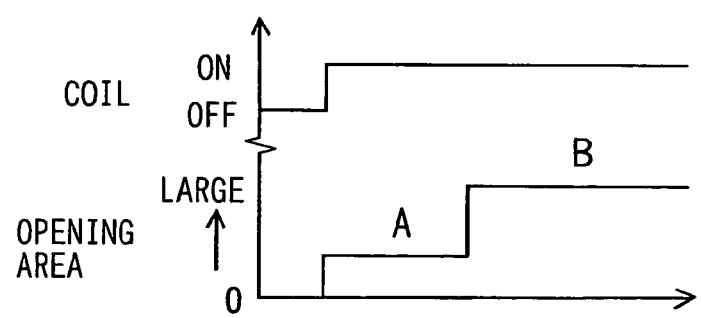
FIG. 7C is a characteristic graph showing the change of the opening area after the coil is energized.

As shown in FIG. 7, a diameter of a fluid-amount controlling portion 202 of the shaft 200 is uniform and a diameter of a communicating passage 212 of the pressure receiving member 210 is uniform. The fluid-amount controlling portion 202 is inserted to the communicating passage 212 as shown in FIG. 7A, and then the fluid-amount controlling member 202 comes out of the communicating passage 212, so that the opening area increases stepwise as shown in FIG. 7C. Then, the difference pressure between the fuel tank 300 and the canister 310 decreases, so that the pressure receiving member 210 is lifted from the second valve seat 70, and the fluid amount of the vapor fuel increases.

(Second and Third Modification)

The second and third modifications respectively are shown in the FIG. 8 and FIG. 9. The same structures as the first modification are described in the same reference numbers.

Figure 8A:
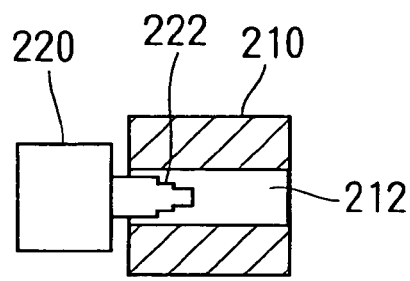
FIGS. 8A and 8B are illustrations showing the lifting status of the shaft according to a second modification.
Figure 8B:
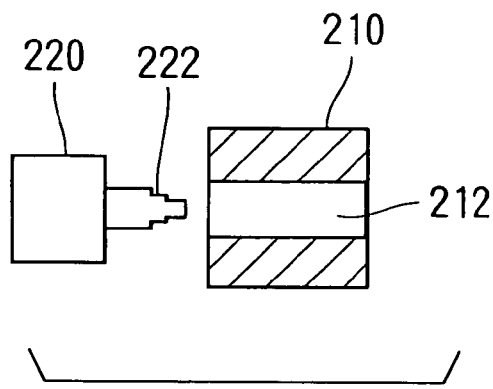
Figure 9A:
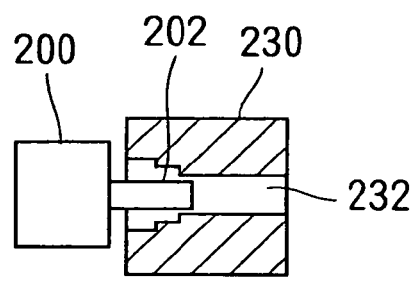
FIGS. 9A and 9B are illustrations showing the lifting status of the shaft according to a third modification.
Figure 9B:
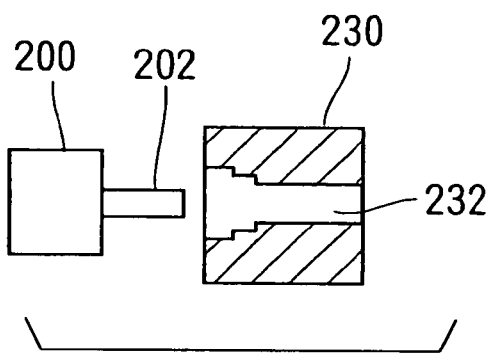

In the second modification shown in FIG. 8A and FIG. 8B, a fluid-amount controlling portion 222 of the shaft 220 tapers stepwise in the three stages in an inserting direction of the communicating passage 212. Then in the third modification shown in FIGS. 9A and 9B, a communicating passage 232 of a pressure receiving member 230 tapers stepwise in the three stages in an inserted direction of the fluid-amount controlling portion 202.

Figure 9C:
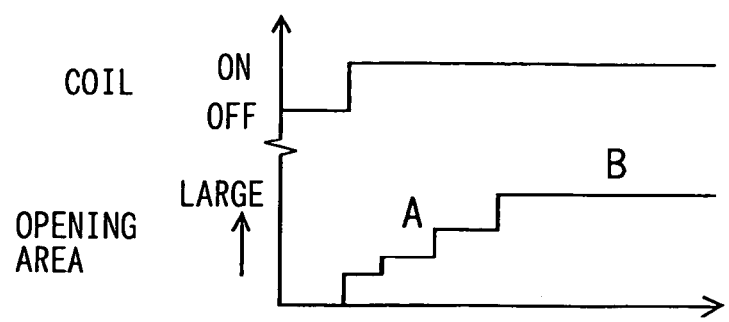
FIG. 9C is a characteristic graph showing the change of the opening area after the coil is energized according to the second and third modifications.

According to the second and third modification, while the pressure receiving member 210 or 230 seats on the second valve seat 17, the shaft 220 or 200 is respectively lifted from the pressure receiving member 210 or 230. Thus, as shown in FIG. 9C, before the fluid-amount controlling portion 242 or 202 retracts from the communicating passage 212 or 232 respectively, the opening area increases stepwise.

(Forth and Fifth Modification)

The Forth and Fifth modifications are respectively shown in FIG. 10 and FIG. 11. The same structures as the first modification are described in the same reference numbers.

Figure 10A:
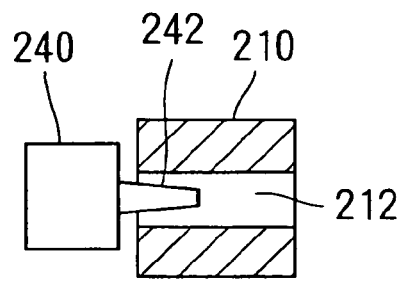
FIGS. 10A and 10B are illustrations showing the lifting status of the shaft according to a forth modification.
Figure 10B:
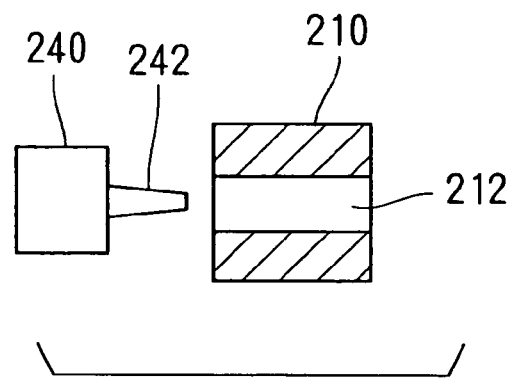
Figure 11A:
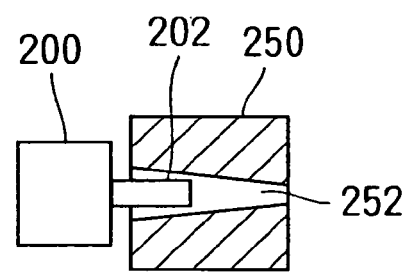
FIGS. 11A and 11B are illustrations showing lifting status of the shaft according to a fifth modification.
Figure 11B:
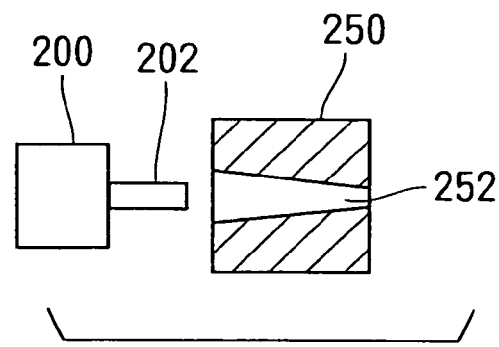

In the forth modification shown in FIGS. 10A and 10B, a fluid-amount controlling portion 242 of a shaft 240 tapers in an inserting direction of the communicating passage 212. Then, in the fifth modification shown in FIGS. 11A and 11B, a communicating passage 252 of a pressure receiving member 250 tapers in an inserted direction of the fluid-amount controlling portion 202.

Figure 11C:
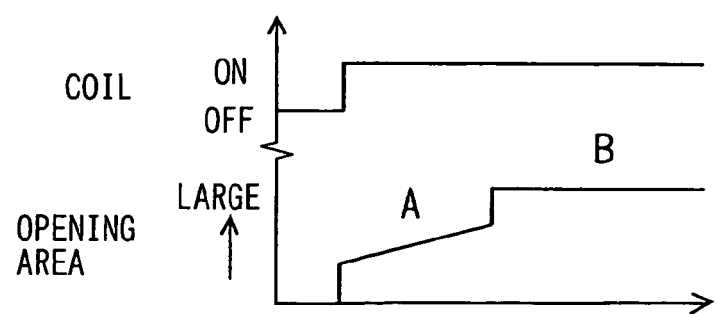
FIG. 11C is a characteristic graph showing the change of opening area after the coil is energized according to the forth and fifth modifications.
Figure 12A:
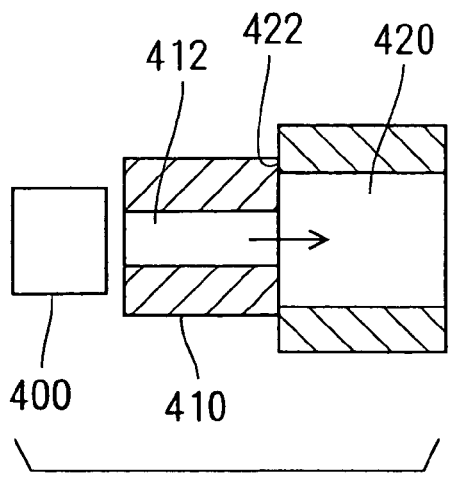
FIG. 12A is a diagram showing a conventional electromagnetic valve including two valves.
Figure 12B:
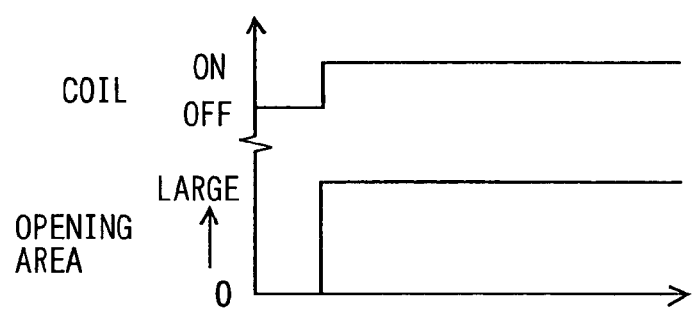
FIG. 12B is a characteristic graph showing a change of the opening area after the coil is energized.
Figure 13:
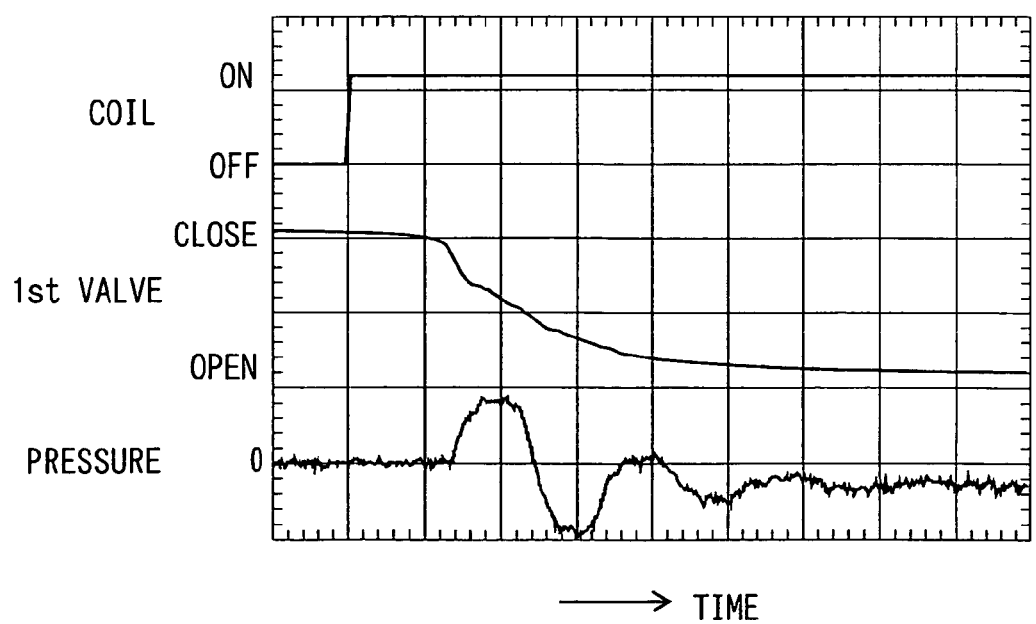
FIG. 13 is a characteristic graph showing the pressure change of the fluid passage when the coil of a conventional electromagnetic valve including two valve bodies is energized.

According to the forth and fifth modifications, while the pressure receiving member 210 or 250 seats on the second valve seat 17, the shaft 240 or 200 is respectively lifted from the pressure receiving member 210 or 250. Thus, as shown in FIG. 11C, while the fluid-amount controlling portion 242 or 202 retracts from the communicating passage 212 or 252, the opening area increases smoothly.

Other Embodiments

The present invention should not be limited to the disclosed embodiment including the modifications, but may be implemented in other ways without departing from the spirit of the invention. That is to say, the shape of the fluid-amount controlling portion can be accordingly combined with the shape of the communicating passage as far as the increase of the opening area is suppressed when the first valve body begins to lift, and then the opening area increases as the lift amount of the shaft increases.

In the second, third, forth, and fifth modifications, although the fluid-amount controlling portion of the shaft retracts from the communicating passage when the shaft is lifted, the fluid-amount controlling portion may be in the communicating passage even if the shaft is lifted to the utmost while the pressure receiving member seats on the second valve seat. In this case, the increase of the opening area is suppressed when the first valve body begins to lift, and then the opening area increases as the lift amount of the shaft increases.

In the above embodiment and modifications, though the electromagnetic valve of the present invention is applied to the fuel tank sealing system, the electromagnetic valve may be applied to the a variety of uses as far as the fluctuation of the lift timing of the second valve body is prevented after the first valve body is lifted.

What is claimed is:

1. An electromagnetic valve, comprising:
   an electromagnetic driving portion;
   a first valve body reciprocated by the electromagnetic driving portion;
   a second valve body including a communicating passage communicating a first passage with a second passage which is located at a downstream end of the first passage, and a first valve seat located at an upstream end of the communicating passage, wherein the first valve body cooperates with the first valve seat in closing the communicating passage;
   a second valve seat on which the second valve body seats,
   wherein when the second valve body seats on the second valve seat while the first valve body seats on the first valve seat, a communication between the first passage and the second passage is shut,
   when the second valve body seats on the second valve seat while the first valve body is lifted from the first valve seat, the communication between the first passage and the second passage is communicated,
   when the first valve body is lifted from the first valve seat while the second valve body seats on the second valve seat, the second valve body is lifted from the second valve seat in response to decrease of pressure difference between the first passage and the second passage,
   the first valve body includes a fluid-amount controlling portion inserted into the communicating passage on a downstream side of the first valve seat while the first valve body seats on the first valve seat, the diameter of the fluid-amount controlling portion decreasing stepwise in an inserting direction and on said downstream side, and
   when the lift amount of the first valve body from the first valve seat increases after the first valve body is lifted from the first valve seat, an opening area of a passage formed between the first valve body, the first valve seat and the communicating passage increases.

2. The electromagnetic valve according to claim 1, wherein when the first valve body is lifted from the first valve seat, the fluid-amount controlling portion retracts from the communicating passage.

3. The electromagnetic valve according to claim 1, wherein the fluid-amount controlling portion is tapered in an inserting direction, and when the lift amount of the first valve body from the first valve seat increases while the first valve body is lifted from the first valve seat and the fluid-amount controlling portion is inserted into the communicating passage, the opening area increases.

4. The electromagnetic valve according to claim 3, wherein the fluid-amount controlling portion is tapered in part in an inserting direction.

5. A vapor fuel treating system, comprising: an electromagnetic valve according to the claim 1; a fuel tank communicated with the first passage; and a canister communicated with the second passage and including an absorbent absorbing a fuel vapor.

6. An electromagnetic valve,
   comprising:
   an electromagnetic driving portion;
   a first valve body reciprocated by the electromagnetic driving portion;
   a second valve body including a communicating passage communicating a first passage with a second passage which is located at a downstream end of the first passage, and a first valve seat located at an upstream end of the communicating passage, wherein the first valve body cooperates with the first valve seat in closing the communicating passage;
   a second valve seat on which the second valve body seats,
   wherein when the second valve body seats on the second valve seat while the first valve body seats on the first valve seat, a communication between the first passage and the second passage is shut,
   when the second valve body seats on the second valve seat while the first valve body is lifted from the first valve seat, the communication between the first passage and the second passage is communicated,
   when the first valve body is lifted from the first valve seat while the second valve body seats on the second valve seat, the second valve body is lifted from the second valve seat in response to decrease of pressure difference between the first passage and the second passage,
   the first valve body includes a fluid-amount controlling portion inserted into the communicating passage on a downstream side of the first valve seat while the first valve body seats on the first valve seat,
   when the lift amount of the first valve body from the first valve seat increases after the first valve body is lifted from the first valve seat, an opening area of a passage formed between the first valve body, the first valve seat and the communicating passage increases, and
   wherein the communicating passage is decreased stepwise in an inserted direction of the fluid-amount controlling portion within an area in which the fluid-amount controlling portion is inserted into the communicating passage, on said downstream side of the first valve seat;
   when the lift amount of the first valve body from first valve seat increases while the first valve body is lifted from the first valve seat and the fluid-amount controlling portion is inserted into the communicating passage, the opening area increases.

7. A vapor fuel treating system, comprising: an electromagnetic valve according to the claim 6; a fuel tank communicated with the first passage; and a canister communicated with the second passage and including an absorbent absorbing a fuel vapor.

* * * * *